US009325799B2

(12) United States Patent
Walker et al.

(10) Patent No.: US 9,325,799 B2
(45) Date of Patent: *Apr. 26, 2016

(54) SYSTEMS AND METHODS FOR COMPUTER IMPLEMENTED TREATMENT OF BEHAVIORAL DISORDERS

(71) Applicants: Joanne Walker, Newton, MA (US); Saul Rosenthal, Newton, MA (US)

(72) Inventors: Joanne Walker, Newton, MA (US); Saul Rosenthal, Newton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/300,445

(22) Filed: Jun. 10, 2014

(65) Prior Publication Data

US 2014/0377728 A1    Dec. 25, 2014

Related U.S. Application Data

(63) Continuation of application No. 13/493,411, filed on Jun. 11, 2012, now abandoned, which is a continuation of application No. 11/934,574, filed on Nov. 2, 2007, now Pat. No. 8,201,223.

(60) Provisional application No. 60/856,507, filed on Nov. 3, 2006.

(51) Int. Cl.
| | |
|---|---|
| *G06F 21/00* | (2013.01) |
| *G06F 17/40* | (2006.01) |
| *G06F 7/04* | (2006.01) |
| *G09B 3/00* | (2006.01) |
| *H04L 29/08* | (2006.01) |
| *G06Q 10/00* | (2012.01) |
| *G06F 17/30* | (2006.01) |
| *H04L 12/26* | (2006.01) |
| *G06F 11/34* | (2006.01) |

(52) U.S. Cl.
CPC ............ *H04L 67/22* (2013.01); *G06F 11/3438* (2013.01); *G06F 17/30598* (2013.01); *G06Q 10/00* (2013.01); *H04L 43/06* (2013.01); *G06F 11/3419* (2013.01); *G06F 2201/81* (2013.01)

(58) Field of Classification Search
None
See application file for complete search history.

(56) References Cited

U.S. PATENT DOCUMENTS

| | | | |
|---|---|---|---|
| 6,003,145 A | 12/1999 | Hong | |
| 6,530,024 B1 * | 3/2003 | Proctor | ........................... 726/23 |
| 6,548,502 B2 | 4/2003 | Zorn et al. | |

(Continued)

FOREIGN PATENT DOCUMENTS

| | | | |
|---|---|---|---|
| JP | 10063535 A | 3/1998 | |
| KR | 20010044579 A | 6/2001 | |

(Continued)

*Primary Examiner* — Christopher Revak
(74) *Attorney, Agent, or Firm* — Finch & Maloney PLLC (57) ABSTRACT

A system and method are provided for treating excessive or problematic computer use. In at least one embodiment, a method is employed to treat excessive or problematic computer use by acquiring information about the unwanted user activity, monitoring user activity for the unwanted behavior, controlling the behavior when it occurs, enabling the user to record self-observations and evaluating the results. This method may employ a computer based system to treat excessive or problematic computer use which includes configuring a user activity monitor with constraints, programmatically enforcing those constraints, reporting the activities monitored and restricted, and enabling a user to input self-observations. Potential constraints include a complete bar on the user activity, as well as, progressively decreasing the amount of time the user may engage in the activity, i.e. titrating the user activity.

22 Claims, 5 Drawing Sheets

(56) References Cited

U.S. PATENT DOCUMENTS

| | | |
|---|---|---|
| 6,606,659 B1 | 8/2003 | Hegli et al. |
| 6,769,066 B1 * | 7/2004 | Botros et al. .................. 726/23 |
| 7,024,399 B2 | 4/2006 | Sumner, II et al. |
| 7,036,145 B1 | 4/2006 | Murphy et al. |
| 7,356,836 B2 | 4/2008 | Beilinson et al. |
| 7,594,266 B2 | 9/2009 | Mattsson et al. |
| 8,201,223 B2 * | 6/2012 | Walker et al. .................. 726/4 |
| 2002/0007459 A1 | 1/2002 | Cassista et al. |
| 2002/0162031 A1 | 10/2002 | Levin et al. |
| 2003/0059750 A1 | 3/2003 | Bindler et al. |
| 2004/0003279 A1 | 1/2004 | Beilinson et al. |
| 2004/0016437 A1 | 1/2004 | Cobb et al. |
| 2004/0067475 A1 | 4/2004 | Niddrie et al. |
| 2004/0191291 A1 | 9/2004 | Tohyama et al. |
| 2004/0225877 A1 * | 11/2004 | Huang .......................... 713/100 |
| 2004/0230834 A1 * | 11/2004 | McCallam ................... 713/201 |
| 2004/0247748 A1 | 12/2004 | Bronkema |
| 2004/0249938 A1 | 12/2004 | Bunch |
| 2005/0080898 A1 | 4/2005 | Block |
| 2005/0086069 A1 | 4/2005 | Watson et al. |
| 2005/0183143 A1 | 8/2005 | Anderholm et al. |
| 2005/0240960 A1 | 10/2005 | Nagtzaam |
| 2006/0010492 A9 | 1/2006 | Heintz et al. |
| 2006/0026114 A1 | 2/2006 | Gregoire et al. |
| 2007/0074284 A1 | 3/2007 | Woog |
| 2007/0130148 A1 | 6/2007 | Wu |
| 2008/0016214 A1 | 1/2008 | Galluzzo et al. |
| 2013/0079602 A1 | 3/2013 | Picard et al. |
| 2013/0080185 A1 | 3/2013 | Picard et al. |

FOREIGN PATENT DOCUMENTS

| | | |
|---|---|---|
| KR | 20010097374 A | 11/2001 |
| KR | 20050078545 A | 8/2005 |

* cited by examiner

SYSTEMS AND METHODS FOR COMPUTER IMPLEMENTED TREATMENT OF BEHAVIORAL DISORDERS

RELATED APPLICATIONS

This application is a continuation and claims benefit under 35 U.S.C. §120 of U.S. application Ser. No. 13/493,411 titled "SYSTEMS AND METHODS FOR COMPUTER IMPLEMENTED TREATMENT OF BEHAVIORAL DISORDERS" and filed on Jun. 11, 2012, which is a continuation and claims benefit under 35 U.S.C. §120 of U.S. application Ser. No. 11/934,574 titled "SYSTEMS AND METHODS FOR COMPUTER IMPLEMENTED TREATMENT OF BEHAVIORAL DISORDERS" and filed on Nov. 2, 2007, now U.S. Pat. No. 8,201,223, issued Jun. 12, 2012, which claims priority under 35 U.S.C. §119(e) to U.S. Provisional Application 60/856,507 filed Nov. 3, 2006 and titled "Methods and Systems for Computer Implemented Treatment of Behavioral Disorders," each of which is hereby incorporated herein by reference in its entirety.

BACKGROUND OF INVENTION

1. Field of Invention

Aspects of the present invention relate generally to systems and methods for computer implemented treatment of behavioral disorders, and more specifically, to a computer implemented system and method for treating excessive or problematic computer use.

2. Discussion of Related Art

Fueled by continued advances in information technology and the growth of the internet, the average person's personal and professional computer use has increased dramatically in recent times. For example, while in the not-too-distant past the internet may have been in the purview of a rather restricted demographic, a 2006 study concluded that 74% of homes in the United States now have Internet access.

While much of this use is positive and productive, for some this amount of computer and internet use can become excessive and problematic. Examples of such excessive and problematic behavior range from simple time mismanagement to severely addictive behavior. For instance, many people spend more time checking email or surfing the web than they allot for such, and many users of internet gaming sites suffer from compulsive gaming habits. Researchers have estimated that one out of every eight Americans show signs of problematic internet use. Such unwanted behavior has garnered the attention of health care providers. For example, a recent publication of the American Medical Association recommended that children's total screen time be limited to 1 to 2 hours a day. Unfortunately, given the ubiquity and necessity of internet and computer use, complete abstinence is not a feasible means of preventing such behavior, and many do not require or are reluctant to seek professional assistance in treating such behavior.

The software industry has authored programs directed toward monitoring and recording computer use. Such systems are often used by employers to control and understand how and where their employees spend their time. Similarly, programs exist that enable a person in authority to prohibit access to specified internet sites and computer applications or to allow access only to specified internet sites and computer applications. These programs are often used by parents or educational personnel to ensure that children have access only to appropriate content.

SUMMARY OF INVENTION

In broad overview, aspects and embodiments of the present invention overcome or alleviate one or more of the problems of conventional behavior modification technology. For instance, at least one embodiment of the present invention provides a system capable of monitoring and gradually curtailing computer and internet use, while allowing the user to record observations about one's reaction to the treatment. These and other elements and features of the present invention yield more effective treatment of unwanted computer use than conventional approaches.

According to one aspect of the present invention, a system is provided for treating unwanted computer use. The system includes a controller configured to control a user activity on a computer system according to at least one constraint. The at least one constraint may either restrict each instance of the user activity to a titrated duration or cause a user to engage in a cognitive restructuring exercise. The system also includes a memory coupled to the controller. The memory may store the at least one constraint.

The system may further include an input coupled to the controller and configured to receive at least one motivator to dissuade a user from engaging in the user activity. The at least one motivator may be associated with at least one user activity. The controller may be further configured to store the at least one motivator in the memory, and the cognitive restructuring exercise may include providing the user with the at least one motivator when the user attempts to perform the user activity. In the system, the at least one motivator may include at least one motivator individually tailored to the user.

In the system, the at least one constraint may include an identifier of the user. In the system, the at least one constraint may be received from an external database. In the system, the at least one constraint may include an identifier of a website to which access is to be constrained. In the system, the at least one constraint may include an identifier of a software application to which access is to be constrained. In the system, the titrated duration may include a progressively decreasing duration that decreases by a constant amount of time for each instance of the user activity. In the system, the titrated duration may include a progressively decreasing duration that decreases by a variable amount of time for each instance of the user activity. In the system, the titrated duration may include a progressively decreasing duration that decreases by a random amount of time for each instance of the user activity. In the system, the controller may be further configured to store a record of the user activity in the memory.

The system may further include an output coupled to the controller and configured to provide the record of the user activity to an external entity. In the system, the input may be further configured to receive information regarding past user activity. The controller may be further configured to store the information regarding past user activity in the memory, and the output may be further configured to provide the past user activity compared to the record of the user activity to an external entity.

In the system, the input may be further configured to receive self-observations from the user. The controller may be further configured to store the information regarding past user activity in the memory, and the output is further configured to provide the self-observations to an external entity.

According to another aspect of the present invention, a computer-implemented method for treating unwanted use of a computer is provided. The method includes receiving at least one constraint identifying a user activity to be constrained and a type of constraint to be imposed on the user activity. The type of constraint may include either restricting the user activity to a titrated duration or causing a user to engage in a cognitive restructuring exercise. The method may also include controlling, by the computer, the user activity according to the at least one constraint.

In the method, controlling, by the computer, the user activity may include storing a record of user activity. In the method, receiving at least one constraint may include receiving at least one motivator to dissuade a user from engaging in the user activity.

The method may also include identifying the user. The method my further include receiving self-observations from the user. The method may further include receiving past user activity, and reporting subsequent user activity compared to the past user activity.

According to another aspect of the present invention, a computer readable medium is provided that includes instructions that when executed by a controller, cause the controller to perform a method that includes receiving at least one constraint identifying a user activity to be constrained and a type of constraint to be imposed on the user activity. The type of constraint may include either restricting the user activity to a titrated duration or causing a user to engage in a cognitive restructuring exercise. The method may also include controlling, by the computer, the user activity according to the at least one constraint.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Various aspects and embodiment of the present invention will now be described in more detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

At least one embodiment of the present invention relates to a method for treating excessive or problematic computer use. This embodiment is discussed further with regard to FIG. 1.

Figure 1:
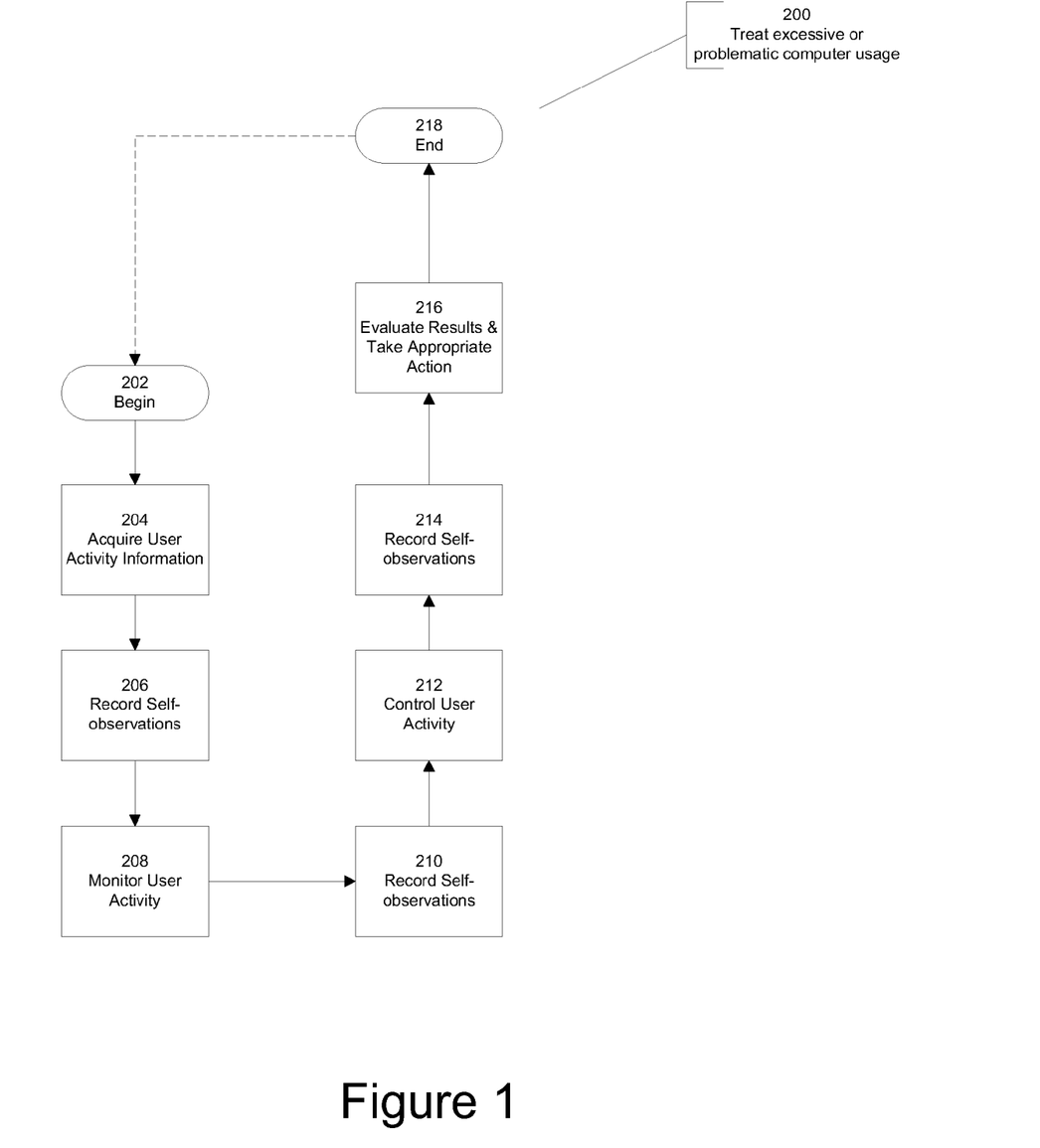
FIG. 1 is a flow chart of a process for treating excessive or problematic computer use according to one embodiment of the invention.

FIG. 1 shows an example process for treating excessive or problematic computer use according to one embodiment of the present invention. This process may be implemented using a general-purpose computer system as discussed with regard to FIG. 3 below. This process may be repeated until the user activity falls within acceptable limits. At the block 202, process 200 begins.

At block 204, user activity information may be acquired. This user activity information may serve as a baseline level of unwanted user activity, e.g. the amount of time a user currently spends performing the activity to be changed. As is described in more detail below, further activity may be compared to the baseline in order to determine progress. In one embodiment, user information may be acquired from information derived from external databases, such as databases that categorize websites and software content. In another embodiment, user information may be acquired from descriptive information contained within the websites or applications themselves. In still another embodiment, the user information may be acquired by the user. Other sources of information may be incorporated as they become available. In general, user activity information may include all of the behaviors that are to be treated. In one embodiment, this information may include specific websites or applications that are to be constrained, the amount of time spent engaging in a user activity that is considered typical for a user, the amount of time an average person spends engaging in this user activity, a list of individually tailored motivators to dissuade the user from engaging in this user activity, e.g. reasons not to engage in the activity and/or alternative courses of action, a categorization hierarchy to which this user activity belongs, e.g. news sites, gaming applications, etc., and the type of constraint to be imposed, e.g. complete bar, titration, etc.

Titration refers to progressive restriction on the amount of time that a person is allowed to engage in a specific activity. The size of the step-down, i.e. the duration by which the titrated activity is decreased per time period or per instance of the titrated activity, varies, and the rate at which the step-down size changes may follow sundry paths including, for example, random, linear or exponential paths. Once a titration schedule has been set, its limits can be enforced without notifying the user of the newly decreased duration. Constraints may be imposed at any level within the categorization hierarchy. This user activity information may be used in subsequent blocks 208 and 212 to both monitor and control actual user activity.

At block 206, self-observations may be recorded. In one embodiment, these observations may be freeform articulations of the user's emotional state before, during and after engaging in unwanted behavior. In another embodiment, self-observations may be placed into a pre-existing form to follow a defined treatment protocol. For instance, a treatment protocol may require the user to record his Subjective Units of Distress (SUDS) level and how much time he anticipates spending engaged in a certain user activity. Alternatively, users may be prompted to engage in cognitive restructuring exercises.

At block 208, user activity may be monitored. In one embodiment, monitored user activity may include interaction with computer input hardware, e.g. keyboard, mouse, etc. and the interaction's effect on the computer software, e.g. which applications are started or which websites are visited. Monitored user activity may be used in subsequent blocks 212 and 216 to facilitate control and evaluation of monitored user activity.

At block 210, additional self-observations may be recorded. As with block 206, these observations may be freeform or may follow a defined treatment protocol, e.g. recording a SUDS level. In one embodiment, these observations may be requested regularly or sporadically, e.g. follow a random or some predefined pattern.

At block 212, monitored user activity may be controlled. The type of control may depend upon the constraints requested by the user in block 204. In one embodiment, if the type of user activity is completely barred, then the user is prevented from engaging in the attempted behavior, e.g. prevented from browsing to a gaming website. If the type of user activity is subject to titration, a step-down from the previous allowed duration may be applied, and the user is then allowed to engage in the activity for the newly determined duration. In another embodiment, the user may be presented with a set of alternative, computer and/or non-computer related activities that are considered more productive than the attempted activity.

At block 214, additional self-observations may be recorded. As with blocks 206 and 210 these observations may be freeform or may follow a defined treatment protocol, e.g. recording a SUDS level. In one embodiment, the user may be asked to estimate the amount of time actually spent engaging in a user activity. In an another embodiment, users may be prompted to follow the "ABC" form of analysis from Cognitive Behavioral Therapy where Antecedents, e.g. emotional states, situational factors, etc.; Behavior, e.g. user activity and emotional states; and Consequences, e.g. decreased productivity, anger from family members, increased debt, etc. are all identified and recorded for later analysis.

At block 216, results may be evaluated and appropriate action may be taken by the user or a health care professional. In an embodiment, this evaluation may include review of user activity reports showing the amount of time spent engaged in unwanted behavior compared to other measures including initial baseline levels and user predicted levels of use recorded at previous blocks, such as blocks 204 and 206. Additionally, the user activity reports may show by user activity: start and stop times, the anticipated duration, the estimated actual duration, the actual duration and the SUDS level. In another embodiment, this content may include a set of activities that could have been accomplished using the time consumed by unwanted user activity.

Further, at block 216, the user may be rewarded upon achieving certain decreased usage milestones. This reward may take any form known in the art including reward tokens, affirmation emails, etc. Lastly, based upon the evaluated results, new courses of action may be prescribed, e.g. a continued step-down duration, a new alternative behavioral suggestion per block 212, etc.

At block 218, process 200 ends.

Figure 2:
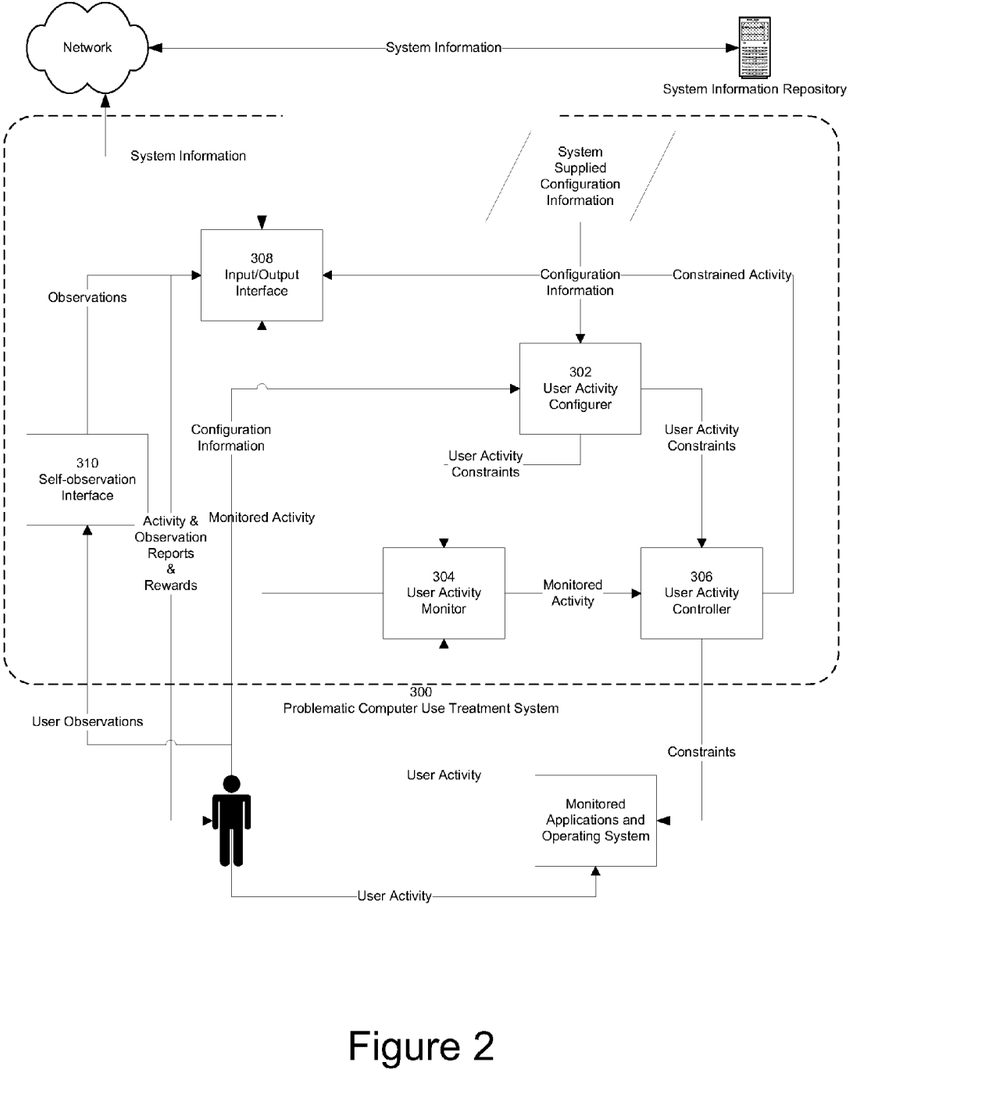
FIG. 2 shows, in context, a system for treating excessive or problematic computer use in accordance with one embodiment of the invention.

FIG. 2 illustrates a system 300 for treating excessive or problematic computer use according to one embodiment of the invention when implemented on one or more computer systems. Any of the recited modules may be implemented in customized software code or using existing software including a GUI, email, FTP, batch system interface, database system data movement tools, middleware, scanning with optical character recognition (OCR), any combination thereof, or otherwise. Moreover, embodiments in accord with the present invention may adopt any modular structure and are not limited to those shown in FIG. 2. The particular modular arrangement presented in FIG. 2 was chosen to promote clarity.

System 300 may include a user activity configurer module 302, a user activity monitor module 304, a user activity controller module 306, an input/output interface module 308, and a self-observation interface module 310. Module 302 may accept user activity information from various sources and supplies modules 304 and 306 with user activity constraints. Module 304 may accept user activity constraints from module 302 and user activity from monitored applications and the operating system. Module 304 may supply user activity to module 306 and monitored activity to module 308. Module 306 may accept user activity constraints from module 302 and user activity from module 304 and supply constrained activity to module 308. Module 306 may also enforce the constraints against monitored applications and the operating system. Module 308 may accept and supply system information from and to a system information repository. Module 308 may also supply rewards and activity reports to users. Module 310 may accept user self-observations and supply self-observations to module 308. Information may flow between these modules using by any means know in the art including, for example, by passing the information over the network via TCP/IP, by passing the information between modules in memory or by writing the information to a file, database, or some other non-volatile storage device.

Module 302 may acquire user activity information such as that discussed above with reference to block 204 of FIG. 1. In one embodiment, an initial set of user activity may be supplied by the system with supplemental activity added by the user. In another embodiment, the system may import this information from an encrypted data stream or from encrypted data files on a storage device or have it supplied by a third party on a subscription basis. Thus, the third party may be able to configure user activity information on behalf of the user.

Module 304 may monitor user activity. Monitoring may include intercepting and decoding both user interaction with hardware and its associated affect on the software being executed. In one embodiment, this monitoring may be implemented by an application that is resident on the computer where the user is active. When the user interacts with the computer, module 304 may be notified through the use of hooks or any other means known in the art to monitor application and system calls, such as, for example, software drivers.

Module 306 may control user activity. In one embodiment, user activity may be controlled by completely barring a particular website or application. In another embodiment, module 306 allows access to an application or website for a limited duration, e.g. when the prescribed constraint is titration. In still another embodiment, module 306 may present a list of suggested alternative activities to dissuade the user from engaging in the unwanted behavior or may present a list of user authored reasons to disengage from the behavior.

Module 308 may act as both a user and a system interface. In one embodiment, module 308 outputs textual and graphical reports of user activity and observation presenting information such as that discussed above with reference to block 216 of FIG. 1. In another embodiment, module 308 may deliver rewards, such as electronic reward tokens or affirmation emails, to the user. Module 308 may also output all system information to a system information repository for back-up, portability or other purposes. Reciprocally, module 308 may import system information from a system information repository for restoration, portability or other purposes.

In another embodiment, the system information repository may be used to store and forward treatment information to health care provider for evaluation, or to statisticians for trend analysis.

Module 310 may present a user interface for entry of self-observations. These observations may be input under a free-form or form driven paradigm. While the content included may cover any subject matter, preferably, SUD levels, emotional and situational antecedents, emotional response to the behavior, and fiscal, familial, and emotional consequences are included.

The modular structure and content recited above is for exemplary purposes only and is not intended to limit the invention to the specific structure disclosed. As will be apparent to one of ordinary skill in the art, many variant modular structures can be architected without deviating from the present invention. For example, these modules may be implemented in as a stand alone executables, services, browser-based forms, browser plug-ins or TSR (Terminate and Stay Resident) applications.

A process for treating excessive or problematic computer use 200 according to one embodiment of the invention may be implemented on one or more general-purpose computer systems. For example, various aspects of the invention may be implemented as specialized software executing in a general-purpose computer system 400 such as that shown in FIG. 3. Computer system 400 may include one or more output devices 401, one or more input devices 402, a processor 403 connected to one or more memory devices 404 through an interconnection mechanism 405 and one or more storage devices 406 connected to interconnection mechanism 405. Output devices 401 typically render information for external presentation and examples include a monitor and a printer. Input devices 402 typically accept information from external sources and examples include a keyboard and a mouse. Processor 403 typically performs a series of instructions resulting in data manipulation. Processor 403 is typically a commercially available processor such as an Intel Pentium, Motorola PowerPC, SGI MIPS, Sun UltraSPARC, or Hewlett-Packard PA-RISC processor, but may be any type of processor. Memory device 404, such as a disk drive, memory, or other device for storing data is typically used for storing programs and data during operation of the computer system 400. Devices in computer system 400 may be coupled by at least one interconnection mechanism 405, which may include, for example, one or more communication elements (e.g., busses) that communicate data within system 400.

Figure 4:
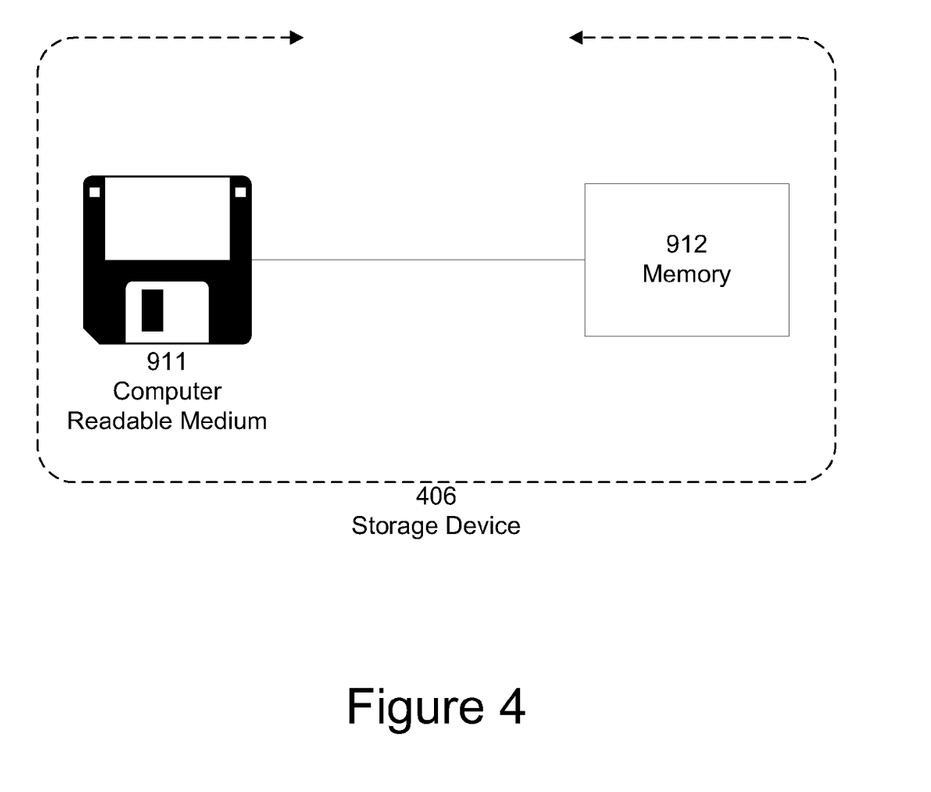
FIG. 4 illustrates a storage device of a general-purpose computer system.

The storage device 406, shown in greater detail in FIG. 4, typically includes a computer readable and writeable nonvolatile recording medium 911 in which signals are stored that define a program to be executed by the processor or information stored on or in the medium 911 to be processed by the program. The medium may, for example, be a disk or flash memory. Typically, in operation, the processor causes data to be read from the nonvolatile recording medium 911 into another memory 912 that allows for faster access to the information by the processor than does the medium 911. This memory 912 is typically a volatile, random access memory such as a dynamic random access memory (DRAM) or static memory (SRAM). It may be located in storage device 406, as shown, or in memory device 404. The processor 403 generally manipulates the data within the memory 404, 912 and then copies the data to the medium 911 after processing is completed. A variety of mechanisms are known for managing data movement between the medium 911 and the memory 404, 912, and the invention is not limited thereto. The invention is not limited to a particular memory device 404 or storage device 406.

Figure 3:
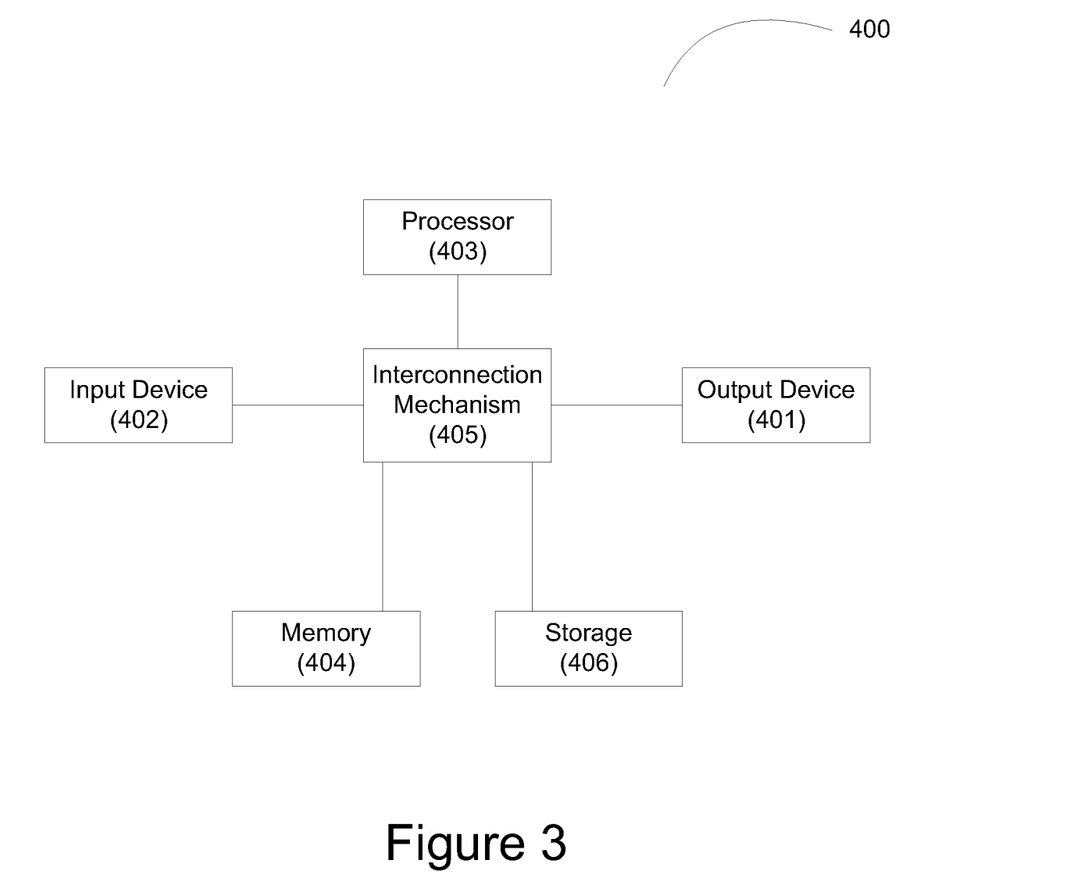
FIG. 3 shows a general-purpose computer system upon which various embodiments of the invention may be practiced.

Computer system 400 may be implemented using specially programmed, special purpose hardware, or may be a general-purpose computer system that is programmable using a high-level computer programming language. For example, computer system 400 may include cellular phones, personal digital assistants and/or other types of mobile computing devices. Computer system 400 usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX operating systems available from various sources (e.g., Linux). Many other operating systems may be used, and the invention is not limited to any particular implementation. For example, an embodiment of the present invention may display a report of monitored user activity using a general-purpose computer system with a Sun UltraSPARC processor running the Solaris operating system.

Although computer system 400 is shown by way of example as one type of computer system upon which various aspects of the invention may be practiced, it should be appreciated that the invention is not limited to being implemented on the computer system as shown in FIG. 3. Various aspects of the invention may be practiced on one or more computers having a different architecture or components than that shown in FIG. 3. To illustrate, one embodiment of the present invention may acquire user activity configuration information using several general-purpose computer systems running MAC OS System X with Motorola PowerPC processors and several specialized computer systems running proprietary hardware and operating systems.

Figure 5:
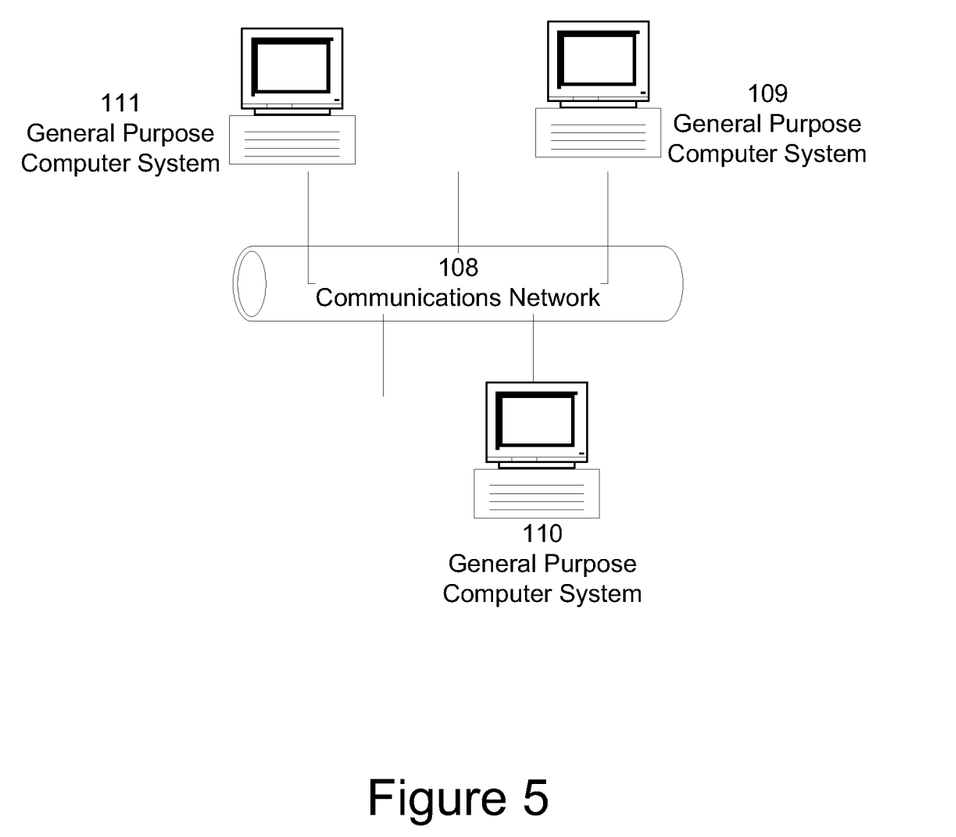
FIG. 5 depicts a network of general-purpose computer systems.

As depicted in FIG. 5, one or more portions of the system may be distributed to one or more computers (e.g., systems 109-111) coupled to communications network 108. These computer systems 109-111 may also be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). To illustrate, one embodiment may acquire user activity information though a browser interpreting HTML forms and may import system information from a system information repository using a data translation service running on a separate server.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. For example, a self-observation information data entry screen may be implemented using Visual Basic while the application designed to monitor user activity may be written in C++.

It should be appreciated that a general-purpose computer system in accord with the present invention may perform functions outside the scope of the invention. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB of UPPSALA, Sweden and WebSphere middleware from IBM of Armonk, N.Y. If SQL Server is installed on a general-purpose computer system to implement an embodiment of the present invention, the same general-purpose computer system may be able to support databases for sundry applications.

Based on the foregoing disclosure, it should be apparent to one of ordinary skill in the art that the invention is not limited to a particular computer system platform, processor, operating system, network, or communication protocol. Also, it should be apparent that the present invention is not limited to a specific architecture or programming language.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

What is claimed is:

1. A system for treating unwanted computer use comprising:
    at least one controller configured to:
        acquire information descriptive of a baseline level of a user activity;
        monitor subsequent user activity on the computer system;
        compare the baseline level of the user activity to the subsequent user activity to generate a user activity report;
        provide the user activity report to an external entity;
        receive information including at least one constraint from the external entity; and
        control one or more instances of the user activity on the computer system according to the at least one constraint, the at least one constraint restricting the one or more instances to one or more titrated durations of progressively decreasing time; and
    a memory coupled to the at least one controller and storing the at least one constraint.

2. The system according to claim 1, wherein the at least one controller is configured to acquire the information descriptive of the baseline level of user activity from at least one of the user, an external database that categorizes content, and information contained within a software application that is the subject of the user activity.

3. The system according to claim 1, wherein the at least one constraint comprises at least one constraint received from an external database.

4. The system according to claim 1, wherein the external entity is a health care provider.

5. The system according to claim 1, wherein the at least one constraint comprises an identifier of an email application to which access is to be constrained.

6. The system according to claim 1, wherein the progressively decreasing time decreases by a constant amount of time for each instance of the one or more instances of the user activity.

7. The system according to claim 1, wherein the progressively decreasing time decreases by a variable amount of time for each instance of the one or more instances of the user activity.

8. The system according to claim 7, wherein the progressively decreasing time decreases by a random amount of time for each instance of the user activity.

9. The system according to claim 1, wherein the at least one constraint includes at least one of a complete bar and presentation of alternative activities.

10. The system according to claim 9, wherein the at least one controller is further configured to receive user activity information from the external entity on a subscription basis.

11. The system according to claim 1, wherein the at least one controller is configured to provide the user activity report to the external entity via a network.

12. The system according to claim 1, wherein the at least one controller is further configured to receive information including a constraint from the user.

13. The system according claim 1, wherein the at least one controller is further configured to provide a reward to the user in response to the user meeting a decreased usage milestone.

14. The system according to claim 1, wherein the at least one controller is configured to acquire the information descriptive of the baseline level of the user activity prior to monitoring unwanted user activity on the computer system.

15. The system according to claim 1, wherein the computer system includes a mobile computing device.

16. A computer-implemented method for treating unwanted use of a computer comprising:
    acquiring information descriptive of a baseline level of a user activity;
    monitoring subsequent user activity on the computer system;
    comparing the baseline level of the user activity to the subsequent user activity to generate a user activity report;
    providing the user activity report to an external entity;
    receiving information including at least one constraint from the external entity; and
    controlling, by the computer, the user activity according to the at least one constraint, the at least one constraint restricting the one or more instances to one or more titrated durations of progressively decreasing time.

17. The method according to claim 16, wherein acquiring the information descriptive of the baseline level of the user activity includes acquiring information from at least one of the user, an external database that categorizes content, and information contained within a software application that is the subject of the user activity.

18. The method according to claim 16, wherein providing the user activity report to the external entity includes providing the user activity report to a health care provider.

19. The method according to claim 16, wherein receiving the information including at least one constraint from the external entity includes receiving the information including the at least one constraint from an external database.

20. The method according to claim 16, further comprising receiving-user activity information from the external entity on a subscription basis.

21. The method according to claim 16, further comprising receiving information including a constraint from the user.

22. A non-transitory computer readable medium comprising instructions that when executed by at least one controller, cause the at least one controller to perform a method including:

acquiring information descriptive of a baseline level of a user activity;

monitoring subsequent user activity on the computer system;

comparing the baseline level of the user activity to the subsequent user activity to generate a user activity report;

providing the user activity report to an external entity;

receiving information including at least one constraint from the external entity; and     controlling, by the computer, the user activity according to the at least one constraint, the at least one constraint restricting the one or more instances to one or more titrated durations of progressively decreasing time.

\* \* \* \* \*